United States Patent [19]

Burgermann

[11] 4,106,864

[45] Aug. 15, 1978

[54] MOTION-PICTURE CAMERA WITH DIAPHRAGM CONTROL SYSTEM HAVING FADEOVER CAPABILITY

[75] Inventor: Norbert Burgermann, Munich, Fed. Rep. of Germany

[73] Assignee: AGFA-Gevaert, A.G., Leverkusen, Fed. Rep. of Germany

[21] Appl. No.: 827,776

[22] Filed: Aug. 25, 1977

[30] Foreign Application Priority Data

Aug. 26, 1976 [DE] Fed. Rep. of Germany ....... 2638403

[51] Int. Cl.² ........................................... G03B 21/36
[52] U.S. Cl. ............................... 352/91 C; 352/91 S; 352/141; 354/23 D
[58] Field of Search ................... 352/91 C, 91 S, 141; 354/23 D

[56] References Cited

U.S. PATENT DOCUMENTS 4,006,975  2/1977  Wagersonner et al. ........... 352/91 C Primary Examiner—Russell E. Adams
Attorney, Agent, or Firm—Michael J. Striker

[57] ABSTRACT

The user selects a fadeover duration by selecting the number of pulses in a reference pulse packet registered by a reference counter. During film transport in either direction, a frame-pulse counter counts up a number of frame pulses equal to the number of pulses in the reference pulse packet, and then performs another frame-pulse counting cycle. Each frame-pulse counting cycle advances a program-step counter. Logic circuitry is responsive to the count on the program-step counter and, during the successive program steps, causes fadeout, film-rewind, and fade-in operations to be performed. The adjusting motor for the diaphragm operates at a speed inversely related to the number of pulses in the reference pulse packet, and the amount by which the adjusting motor changes the diaphragm setting during each frame-pulse counting cycle is always the same.

18 Claims, 3 Drawing Figures

MOTION-PICTURE CAMERA WITH DIAPHRAGM CONTROL SYSTEM HAVING FADEOVER CAPABILITY

BACKGROUND OF THE INVENTION

The invention relates to motion-picture cameras provided with a diaphragm control system capable of fade-out, fade-in and/or fadeover effects, of the type wherein decrease of diaphragm aperture performed for fade-out is always performed to the extent of a constant amount of diaphragm-setting change, with the diaphragm control system continuing to be capable of negative-feedback light-responsive diaphragm control even after the fade-out has been effected.

SUMMARY OF THE INVENTION

It is a general object to provide a motion-picture camera in which the control of all operations performed in the course of a fadeover are performed electronically.

It is another object to provide a motion-picture camera with a system which permits preselection of the number of film frames to be involved in a fade-out, a fade-in and/or a fadeover.

A further object is to provide a system so designed as to operate in a very reliable manner and comprised of electronic circuitry which is inherently of small dimensions.

These objects and advantages, and others which will become clear from the description of exemplary embodiments, can be met according to one concept of the invention by generating a reference pulse packet and basing the operation of counters thereon. The user, in selecting the duration of a fade-out, fade-in or fadeover, selects the number of pulses to be contained in a reference pulse packet. These pulses are registered and stored, until the end of the selected operation, by a reference counter. A film-frame counter counts film frames, and when the frame count reaches the count on the reference counter, another frame-counting cycle commences. Each completion of a frame-counting cycle advances a program-step counter by one step. Logic circuitry detects the count on the program-step counter and in dependence thereon effects the operations required for a fade-out, fade-in or fadeover in the proper sequence. Thus, the reference pulse packet registered by the reference counter serves as a time norm for the successive program steps.

In addition, the reference pulse packet registered by the reference counter can also be used as a time norm for the performance of individual phases of the sequence of operations to be performed. For example, the fade-out and fade-in phases of a fadeover are subdivided into three sub-phases each, to achieve an optimum fadeover action. During the first sub-phase, the frame-pulse counter is activated and the program-step counter set into operation, and the film-transport motor is switched for forward film transport, but no fade-out is performed. During the second sub-phase, the frame-pulse counter performs a second frame-pulse counting cycle, and the first phase of the actual fade-out is begun. During the third sub-phase, the frame-pulse counter performs its third counting cycle, and the actual fade-out is completed. The subsequent film-rewind operation is likewise broken down into three sub-phases, during which the frame-pulse counter performs three counting cycles. Then the fade-in operations are performed, broken down into three sub-phases, during which the frame-pulse counter performs three counting cycles.

According to an important concept of the invention, at the end of each frame-pulse counting cycle, the amount by which the adjusting motor has changed the diaphragm setting will always be the same, irrespective of the number of pulses in the reference pulse packet, i.e., irrespective of the preselected length of the fade-out, fade-in or fadeover. According to one concept of the invention, this is achieved by making the adjustment speed of the diaphragm adjusting motor dependent upon the number of pulses in the reference pulse packet, but inversely related thereto.

According to another concept of the invention, the diaphragm adjusting motor is a stepper motor, supplied with energizing pulses by an oscillator. The charging or discharging current path of the timing stage of the oscillator contains an electronic switch. The electronic switch, during a time interval which is inversely proportional to the number of pulses in the reference pulse packet, is rendered conductive and non-conductive; the frequency at which the electronic switch is rendered conductive and non-conductive is constant. The ON/OFF control of the switch matches the charging or discharging action of the timing stage of the oscillator to the number of pulses in the reference pulse packet. During a fade-out cycle, a fade-in cycle or a fadeover cycle, the speed at which the stepper motor adjusts the diaphragm is constant.

According to a preferred concept of the invention use is made of a third counter, whose counting capacity is the same as that of the frame-pulse counter and the reference counter. This third counter counts pulses from the pulse generator which was used to originally provide the reference pulse packet. A comparator compares the counts on the third counter and the reference counter, and the output of the comparator is connected, via logic elements, to the semiconductor switch of the diaphragm control system. When the comparator determines that the counts on the third counter and the reference counter are the same, it readies the third counter for another counting cycle. Accordingly, the clocking frequency for the ON/OFF activation of the semiconductor switch is determined by comparison of the count on the third counter against the number of pulses in the reference pulse packet registered by the reference counter. As a result, if the user during the course of a fade-out, fade-in or fadeover should for some reason change the selection of the number of frames to be involved in the operation in question, this will have no effect upon the operation itself. However, when the fade-out, fade-in or fadeover operation is completed, then the changed selection of frame number will result in the generation of a new reference pulse packet, i.e., containing a different number of pulses, which will be registered by the reference counter as a time norm for use in the next such operation which the user selects. Also, if the user wishes, he can during an in-progress fadeover operation preselect the duration of a fade-out or fade-in to be performed after the in-progress fadeover operation, without having to first wait for the in-progress operation to be completed.

Preferably, the comparators which compare the counts on the frame-pulse counter and the third counter against the count on the reference counter are each constituted by EXCLUSIVE-OR gates whose outputs are connected to the input of a NOR-gate.

According to an advantageous concept of the invention, the program-step counter is a 1-out-of-n counter; i.e., it has n outputs, and each different count is constituted by a "1" signal on a single respective one of the n outputs. The outputs of the program-step counter are subdivided into five output groups, each of which consists of one or more than one output. The first output group is connected to logic elements which unblock the frame-pulse line for transmission of frame pulses to the frame-pulse counter and unblock the transmission line between the third counter and the semiconductor switch of the timing stage of the diaphragm control system.

The second and fifth output groups, which consist of the same number of outputs, are connected to an OR-gate, the output signal of which connects the film-transport motor for forward film transport. The third output group, which consists of a number of outputs equal to that of the second group and equal to that of the fifth group, is connected to an OR-gate, the output signal of which connects the film-transport motor for reverse film transport. The fourth output group is connected to the OR-gate for the second and fifth output groups, and also to a further OR-gate the inputs of which are also connected to the outputs of the second and third output groups, this latter OR-gate providing control signals for initiating the actual fade-out and fade-in diaphragm-setting changes.

According to a preferred concept of the invention, the reference pulse packet is generated by means of a first pulse generator, the pulse train of which is transmitted through a gating circuit whose throughpass time interval is selectable by the user.

Preferably, the gating circuit includes a second pulse generator whose frequency is smaller than that of the first pulse generator. The pulse-duration/interpulse-pause-duration ratio of the second pulse generator or its frequency is selectable by the user, and it is this which determines the duration of the aforementioned throughpass time interval of the gating circuit. A fadeover switch changes the state of a bistable storage device, causing it to register a fadeover command for the entirety of the fadeover operation. The fadeover command controls a first gate, connected in the transmission line for the frame pulses. A second gate is connected to the frame-pulse transmission line and to the second or reference counter. The state of the second gate changes, if a frame-pulse is present and the second or reference counter has begun to count, i.e., begun to register the reference pulse packet. This gate, through the intermediary of further gates, is connected to one input of a second bistable storage device, the other input of which is connected to the second pulse generator. The clock input of the second bistable storage device is connected to the first pulse generator. The output of the second bistable storage device is connected to one input of an AND-gate, whose other input is connected to the second pulse generator, and whose output is connected to the second or reference counter. In this way, the reference pulse packet is not registered by the reference counter until, after the start of the first frame pulse, a complete pulse has been furnished from the second pulse generator. This assures that a complete reference pulse packet will be registered by the reference counter, i.e., that the first pulse of the packet will not be almost finished when it begins to be registered by the reference counter.

According to an advantageous concept of the invention, the frequency of the ON-OFF activation of the electronic switch in the timing stage of the diaphragm control system is equal to the frequency of the second pulse generator.

Advantageously, the first and second bistable storage devices are both JK master-slave flip-flops.

Advantageously, the clock input of the first JK master-slave flip-flop is connected to the first pulse generator, and its reset input is connected to the output of the gate leading to the fadeover switch, its set input and its K-input being permanently locked at zero voltage. One input of the second gate is advantageously connected to a NOR-gate whose inputs are connected to the outputs of the second or reference counter.

Advantageously, a control line leads from the second gate to the counting input of the program-step counter, the first output of the program-step counter, which carries a "1" signal before program-steps begin to be counted, being connected to the input of an inverter, whose output is connected to one input of a NOR-gate, the other input of which is connected to the fadeover switch. The advantage of this is that, before the user closes the fadeover switch, the first JK master-slave flip-flop operates asynchronously, because a signal is applied to its reset input. The pulses supplied from the first pulse generator to the clock input of this flip-flop have no effect upon the flip-flop. Only after the user closes the fadeover switch, does the flip-flop receive at its reset input a zero signal, become synchronized and become operative.

Advantageously, between the second gate, which is preferably a NAND-gate, of the frame-pulse transmission line and the program-step counter, there is connected an OR-gate which is additionally connected to the NOR-gate of the comparator. The OR-gate advantageously has a further input connected to an AND-gate, whose one input is connected to the camera release switch and whose other input is connected to the fourth output group of the program-step counter. This assures that, after the fade-out and rewind phases of a fadeover have been completed, the film-transport motor will remain energized for a time interval sufficient for the completion of the fade-in phase, irrespective of how long the user actually keeps the camera release switch closed during the fade-in phase.

According to an advantageous concept, the individual circuit components are C-MOS integrated, and at least the second counter, the program-step counter, the first bistable storage device, the gate connected to the fadeover switch, and also the inverter connected to the first output of the program-step counter, are connected to the power supply at least for the duration of a fadeover program, in particular during the time interval between completion of rewind and performance of fade-in. The advantage of this is that the circuit arrangement consumes very little power during use. Use of C-MOS integrated circuit technique furthermore requires very little space for the circuitry. Due to the very low power consumption, It is possible to keep the aforementioned circuit components, i.e., the ones which store information identifying the point thus far reached within an in-progress program, continually connected to power, without appreciably shortening the lifetime of the camera power supply. Thus, after fade-out and rewind phases of a fadeover are completed, and the camera waits in readiness for the filming of the scene to be faded-in, the information concerning what point of the fadeover program has been reached cannot become erased.

According to another concept, the semiconductor switch of the diaphragm control system is a transistor, whose base is connected to the output of an AND-gate, one input of which is connected to the output of the inverter connected to the first output line of the program-step counter with its other input connected to the NOR-gate of the third counter, the reset input of the third counter being connected to a gate whose one input is connected to the output of the inverter for the first output line of the program step counter with its other input connected via an inverter and a differentiator to the output of the second pulse generator. The output of the NOR-gate is connected to the clock input of the third counter. Advantageously, when the counts on the second and third counters are equal, the NOR-gate arrests the third counter. Furthermore, at the end of the interpulse interval following the pulse just furnished by the second pulse generator, the positive flank of the next-following pulse erases the third counter, and the latter becomes readied for another counting cycle as this positive flank is passed. This makes for a precise simulation of the pulse from the second pulse generator by the second counter; i.e., the reference pulse packet registered by the second counter is used to create a pulse simulating the pulse produced by the second pulse generator when the program was initiated. Thus, it is the duration of the pulses from the second pulse generator, and accordingly of the reference pulse packet, in existence at the commencement of the program which thereafter governs; changes in duration of the reference pulse packet manually effected during the course of an in-progress program have no effect upon the rate at which the program proceeds. The critical time interval between the fade-out and rewind and the subsequent fade-in, during which the user may have forgotten about the fadeover and inappropriately selected a different reference pulse packet, becomes entirely uncritical. If the user does, for whatever reason, change the preselection of the reference pulse packet length before the fade-in of a fadeover operation has yet been performed, the possibility that an improper exposure will result during the fade-in is absolutely precluded. Advantageously, the aforementioned differentiator includes a rectifier which can only pass the positive-going flanks of the pulses from the second pulse generator; this assures that the start of the next counting cycle of the third counter always starts at the start of a pulse from the second pulse generator.

According to an alternative concept, the clock input of the first counter is connected to a pulse-converter stage having a clock input connected to the frame-pulse switch of the camera and having a signal input connected to the first pulse generator, with the clock input receiving a predetermined number of pulses per frame pulse. For example, during a fade-out or a fade-in, the first counter performs three counting cycles. Thus, by raising the number of pulses in the reference pulse packet by one pulse, the film length involved in the fade-out or fade-in is increased by three frames. Using the aforementioned pulse-converter stage, this incremental change can be reduced by a factor corresponding to the conversion factor of the converter. If the pulse converter supplies to the first counter four pulses per frame pulse, then the incremental change of the fadeover duration which the user can select corresponds to three fourths of a frame. This makes the range of available fadeover durations almost continuous, i.e., stepless.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DRESCRIPTION OF THE DRAWING

FIGS. 1a and 1b are the left and right halves of a single circuit diagram illustrating an exemplary embodiment of the invention; and FIG. 2 depicts a modification of a part of the embodiment depicted in FIGS. 1a and 1b.

DESCRIPTION OF THE PREFERRED EMBODIMENTS

Figure 1A:
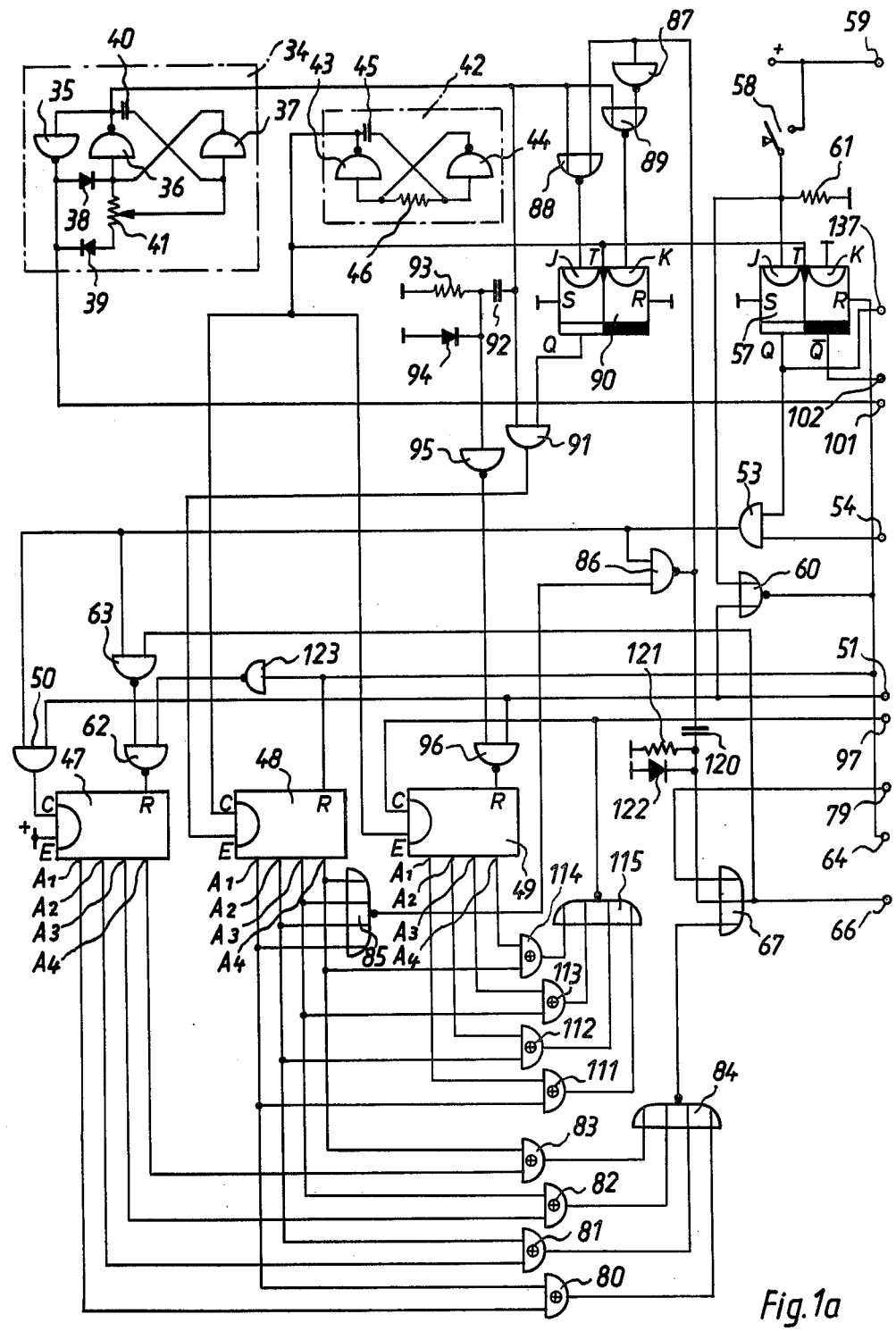
Figure 1B:
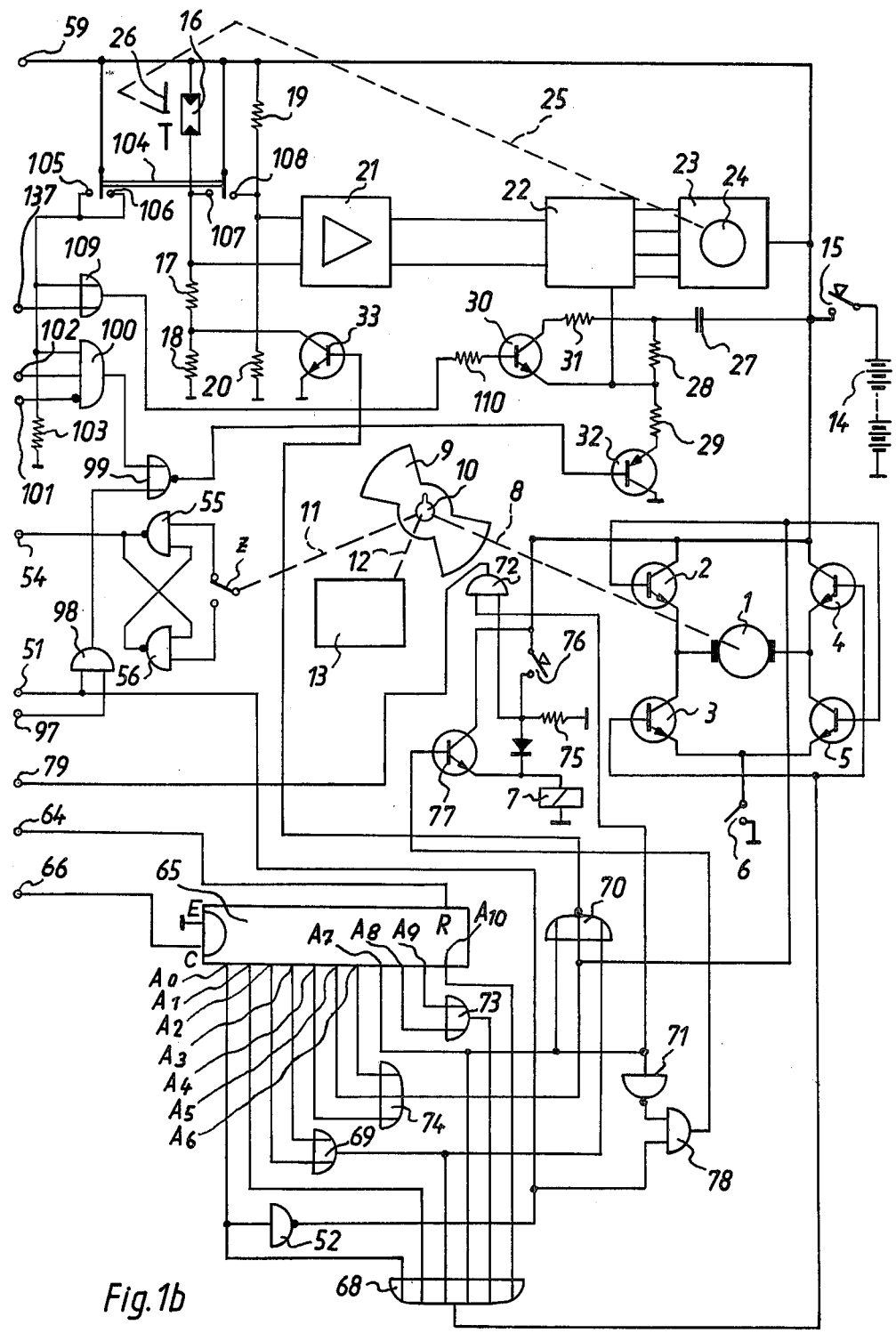

FIGS. 1a and 1b together depicts the circuit diagram of an exemplary embodiment.

As shown in FIG. 1b, a film drive motor 1 is connected in the diagonal of a bridge circuit whose branches contain respective transistors 2, 3, 4, 5. The bases of transistors 2, 5 are connected in common; the bases of transistors 3, 4 are connected in common. Transistors 3 and 4 are conductive for forward motor operation; transistors 2 and 5 are conductive for reverse motor operation. Connected in the common emitter branch of transistors 2–5 is the contact 6 of a relay 7. A mechanical coupling 8 couples the motor 1 to a rotary shutter 9 whose rotary pin is denoted by 10. A mechanical coupling 11 extends from a projection on rotary pin 10 to a frame-pulse contact z. A mechanical coupling 12 couples the rotary pin 10 to a (schematically depicted) film transport mechanism 13. The camera battery is denoted by 14. The battery 14 is connectable to the illustrated circuit by means of a battery-connected switch 15.

A negative-feedback diaphragm-control system includes a light-sensitive voltage divider comprised of a photoresistor 16, a resistor 17 and a fadeover resistor 18. A further voltage divider includes a resistor 19 and another resistor 20. The taps of these voltage dividers are connected to the inputs of a comparator amplifier 21, the two outputs of which are connected to a stepper motor control circuit 22. The stepper motor control circuit 22 has four outputs connected to four (non-illustrated) stator windings of a stepper motor 23, whose armature 24 is coupled via a mechanical coupling 25 to a diaphragm 26.

The stepper motor control circuit 22 includes a (non-illustrated) oscillator, whose time-constant components are expressly depicted and constituted by a capacitor 27 and resistors 28 and 29. A transistor 30 when conductive connects a resistor 31 in parallel to resistor 28. A control transistor connected in the current path of time-constant elements 27–29 is denoted by 32. A transistor switch 33 is connected in parallel to the fadeover resistor 18.

A pulse generator 34 (FIG. 1a) comprises inverters 35, 36, 37, rectifiers 38, 39 and timing elements 40, 41, which latter establish the frequency or ON/OFF ratio of the pulse train produced. Resistor 41 is adjustable by means of a non-illustrated adjusting device manually operable by the photographer. The duration of the pulses produced by pulse generator 34 (referred to hereinafter as the second pulse generator) is infinitely (i.e., steplessly) adjustable.

A further pulse generator 42 (referred to hereinafter as the first pulse generator) comprises two inverters 43, 44, and a timing stage 45, 46. The constant frequency of the pulse train furnished by pulse generator 42 is higher than the frequency of that furnished by second pulse generator 34. Numerals 47, 48, 49 denote three identical binary counters. These counters are so-called four-bit counters, whose outputs are denoted by A1, A2, A3, A4. Each counter 47, 48, 49 has a clock input C, a control input E and a reset input R. Each of the counters 47, 48, 49 can count 15 pulses, if one does not consider the 0000 states of these counters.

The control input E of first counter 47 is permanently connected to positive potential. The clock input C of first counter 47 is connected to the output of an AND-gate 50, whose one input is connected via connections 51 to the output of an inverter 52 and whose other input is connected to the output of an AND-gate 53. One input of AND-gate 53 is connected via connections 54 to the output of a pulse shaper 55, 56, the input of which is connected to the frame-pulse contact z. The other input of AND-gate 53 is connected to the output Q of a JK master-slave flip-flop 57. The J-input of JK flip-flop 57 is connected with a fadeover switch 58, via which the J-input through the intermediary of connections 59 is connectable to the positive terminal of battery 14. The K-input of JK flip-flop 57 is connected to ground. The same applies to the S-input. The R-input of JK flip-flop 57 is connected to the output of a NOR-gate 60, whose one input is connected via a resistor 61 to ground and via the fadeover switch 58 to the positive terminal of battery 14. The other input of NOR-gate 60 is connected via connections 51 to the output of inverter 52.

The output of NOR-gate 60 is additionally connected, via an inverter 123, with one input of a NAND-gate 62, whose output is connected to the R-input of counter 47; the other input of 62 is connected to the output of a NOR-gate 63. Additionally, the output of NOR-gate 60 is connected to the R-input of second counter 48 and, via connections 64, to the input R of a program-step counter 65, the latter being here a binary counter operating on a 1-out-of-11 basis (i.e., only one of its 11 outputs carries a "1" signal at any given time). The control input E of counter 65 is connected to ground, whereas its clock input C is connected via connections 66 with the output of an OR-gate 67. The eleven outputs of counter 65 are denoted by A0, A1, A2, A3, A4, A5, A6, A7, A8, A9, A10. The first output A0 is connected to the input of an inverter 52; also, first output A0 is connected to an input of an OR-gate 68. Output A1 of counter 65 is connected to the second input of OR-gate 68. Outputs A2 and A3 of counter 65 are connected to the two inputs of an OR-gate 69, whose output is connected to the third input of OR-gate 68 and to one input of a NOR-gate 70. Output A7 of counter 65 is connected to the fourth input of OR-gate 68, and also to another input of NOR-gate 70, and furthermore, to the input of an inverter 71. Additionally, output A7 is connected to the input of an AND-gate 72. Outputs A8 and A9 of counter 65 are connected to the inputs of an OR-gate 73, whose output is connected to the fifth input of OR-gate 68. Output A10 is connected to the sixth input of OR-gate 68. Outputs A4, A5, and A6 of counter 65 are connected to the inputs of an OR-gate 74, whose output is connected to a further input of NOR-gate 70.

Additionally, the output of OR-gate 74 is connected to the bases of the two transistors 2, 5.

The output of OR-gate 68 is connected to the bases of the two transistors 3, 4.

The input of AND-gate 72 normally connected to ground via a resistor 75 is connectable to the positive terminal of battery 14 by means of a release switch 76. A transistor 77 is connected in parallel to release switch 76. The base of transistor 77 is connected to the output of an AND-gate 78; one input of 78 is connected to the output of inverter 71, and the other input of 78 is connected to the output of inverter 52.

The output of AND-gate 72 is connected via connections 79 to one of the three inputs of OR-gate 67.

Outputs A1 to A4 of first counter 47 are connected to the first inputs of respective EXCLUSIVE-OR-gates 80, 81, 82, 83. The second inputs of these EXCLUSIVE-OR-gates are connected to the corresponding outputs A1 to A4 of second counter 48. The outputs of EXCLUSIVE-OR-gates 80–83 are connected to respective inputs of a NOR-gate 84, whose output is connected to another input or OR-gate 67.

The outputs A1–A4 of second counter 48 are also connected to the inputs of a NOR-gate 85, whose output is connected to one input of a NAND-gate 86. The other input of NAND-gate 86 is connected to the output of AND-gate 53.

The output of NAND-gate 86 is connected, via a first control line which includes a differentiator stage 120, 121, 122, to the third input of OR-gate 67. A further control line extends from the output of NAND-gate 86 to the input of an inverter 87 and also to one input of a NOR-gate 88. The output of inverter 87 is connected to one input of a NOR-gate 89. The other inputs of NOR-gates 88, 89 are connected in common to the output of the second pulse generator 34. The output of NOR-gate 88 is connected to the J-input of a second JK master-slave flip-flop 90, whose K-input is connected to the output of NOR-gate 89. The S and R inputs of JK flip-flop 90 are connected to ground. The output Q of the second JK flip-flop 90 is connected to one input of an AND-gate 91. The second input of AND-gate 91 is connected to the output of the second pulse generator 34. The output of AND-gate 91 is connected to the control input E of the second counter 48. The clock inputs T of the first and second JK master-slave flip-flops 57 and 90 are connected to the output of the first pulse generator 42.

A first control line extends from the output of the first pulse generator 42 to the clock input C of the second counter 48; a second control line extends from the output of pulse generator 42 to the control input E of third counter 49.

A further control line extends from the output of second pulse generator 34, via a differentiator stage 92, 93, 94, to the input of an inverter 95, whose output is connected to one input of a NAND-gate 96. The other input of NAND-gate 96 is connected via connections 51 to the output of inverter 52.

The output of NAND-gate 96 is connected to the R-input of third counter 49.

Clock input C of third counter 49 is connected via connections 97 to one input of an AND-gate 98, whose other input is connected to the output of inverter stage 52. The output of AND-gate 98 is connected to one input of a NOR-gate 99, whose output is connected to the base of control transistor 32. The other input of NOR-gate 99 is connected to the output of an NAND-gate 100, whose one input is connected via connections 101 to the output of the second pulse generator 34. Another input of AND-gate 100 is connected via connections 102 to the output $\bar{Q}$ of the first JK master-slave flip-flop 57. The third input of AND-gate 100 is connected via a resistor 103 to ground. This input is connectable via a fade-in/fade-out switch 104 to the positive terminal of battery 14.

The contacts of the fade-in/fade-out switch 103 are denoted by 105, 106, 107, 108. Contacts 105, 106 are connected to a first input of a NOR-gate 109, whose other input is connected via connections 137 to the Q input of JK flip-flop 57. The output of NOR-gate 109 is connected via a resistor 110 to the base of control transistor 30.

The outputs A1–A4 of the second counter 48 are connected to the first inputs of respective EXCLUSIVE-OR-gates 111, 112, 113, 114. The second inputs of these EXCLUSIVE-OR-gates 111–114 are connected to the corresponding outputs A1–A4 of the third counter 49. The outputs of EXCLUSIVE-OR-gates 111–114 are connected to the inputs of a NOR-gate 115, whose output is connected via connections 97 to one input of AND-gate 98 and furthermore to the clock input C of third counter 49.

The operation of the illustrated circuit is as follows:

When the battery-connect switch 15 is closed, the circuit is ready for operation. The two pulse generators 34, 42 produce their pulse trains, with that of first generator 42 being of higher repetition frequency than that of generator 34. It is assumed, here, that these two repetition frequencies differ by a factor of 16, this factor being equal to the maximum count registrable by counter 48. Accordingly, during one period of pulse generator 34, a maximum of 16 pulses from generator 42 can be counted. The fadeover switch 58 is in its normal setting (open). Consequently a "0" signal is applied to the upper input of gate 60. Program-step counter 65 is likewise in its normal setting, a "1" signal being present on its output A0. This "1" signal is applied via inverter 52 as a "0" signal to the second input of gate 60. Accordingly, there is present at the output of gate 60 a "1" signal, which blocks the JK flip-flop 57 and the counters 47, 48, 65 via their respective R-inputs. Therefore, there is present at the output Q of JK flip-flop 57 a "0" signal, which is applied to the upper input of gate 53. This prevents AND-gate 53 from transmitting frame pulses from frame-pulse switch z. The output of gate 86 carries a "1" signal, which via inverter 87 is applied as a "0" signal to the right input of gate 89. The K-input of second JK flip-flop 90 is clocked at the rate at which pulse generator 34 furnishes pulses. However, JK flip-flop 90 remains in its normal setting.

During normal filming, it is only release switch 76 which is closed. When release switch 76 is closed, relay 7 becomes energized and contact 6 closes. Transistors 3 and 4 become conductive, because their bases receive "1" potential via the OR-gate 68. Motor 1 operates in the forward transport direction. Frame counting, i.e., counting of the frame pulses from frame-pulse switch z, does not occur because AND-gate 53 is disabled.

If now a fade-in or a fade-out is to be performed, the fade-in/fade-out switch 104 is displaced in the appropriate direction. For both fade-in and fade-out, gate 100 becomes enabled and a "1" signal appears at the output of OR-gate 109. The output $\bar{Q}$ of JK flip-flop 57 carries a "1" signal, so that AND-gate 100 will produce an output "1" signal is synchronism with the clocking pulses from pulse generator 34, and this "1" signal is applied, in the form of a "0" signal transmitted by NOR-gate 99, to the base of transistor 32. When transistor 32 is non-conductive, the oscillator internal to control circuit 22 (its time-constant components 27, 28, 29, 31 shown externally) cannot produce stepper-motor energizing pulses. When transistor 32 is conductive, the oscillator internal to control circuit 22 generates stepper motor energizing pulses, at the frequency determined by components 27–29 if transistor 30 happens to be non-conductive, or at the frequency determined by components 27–29 and 31 if transistor 30 happens to be conductive. Accordingly, when transistor 32 is rendered conductive and non-conductive at the pulse-repetition frequency of second pulse generator 34, the stepper-motor energizing-pulse-generating oscillator internal to control circuit 22 is likewise rendered operative and inoperative. Accordingly, the average rate at which stepper motor control circuit 22 can furnish stepper-motor energizing pulses is determined by the base repetition frequency to which it is set (by 27–29 or 27–29 and 31) multiplied by the pulse duty factor of the pulse train furnished by pulse generator 34. The pulse duty factor of this pulse train is its pulse duration multiplied by its pulse-repetition rate. Accordingly, if the pulse duty factor of the pulse train from generator 34, and therefore the pulse duty factor of transistor 32, is e.g. 80%, (transistor 32 conductive for 80% of its period and non-conductive for 20% of its period), then the average rate at which stepper motor control circuit 22 can furnish stepper-motor energizing pulses is equal to the frequency established for its internal oscillator, multiplied by 80%. I.e., the adjusting speed of motor 23 will be directly proportional to the pulse duty factor of pulse generator 34, manually selected by the photographer using potentiometer 41.

As indicated above, for both fade-in and fade-out a "1" signal is present at the output of OR-gate 109, and transistor 30 is therefore conductive, thereby establishing an elevated base frequency for the oscillator internal to control circuit 22, to increase the base adjustment speed of stepper motor 22 for fade-in and fade-out.

If potentiometer 41 of second pulse generator 34 were adjusted to a setting in which transistor 32 is maintained uninterruptedly conductive, then the internal oscillator of stepper motor control circuit 22 would be uninterruptedly operative, and the elevated base frequency of the internal oscillator (elevated because transistor 30 is conductive) would determine the average rate at which stepper-motor energizing pulses are applied; i.e., the adjustment speed of the stepper motor would be maximum. The diaphragm 26 is opened up (for fade-in) or closed down (for fade out). In general, however, the setting of potentiometer 41 of second pulse generator 34 is such that the pulse duty factor of transistor 32 is less than 100%, so that the application of energizing pulses to the stepper motor 23 from the control circuit 22 is periodically interrupted, i.e., interrupted at the pulse-repetition frequency of pulse generator 34. Accordingly, the alternating conduction and non-conduction of transistor 32 causes a correspondingly slower fade-in or fade-out to be performed by diaphragm 26. Again, it is noted that the adjusting speed of stepper motor 23 is directly proportional to the pulse duty factor established by resistor 41 for second pulse generator 34. Because the JK flip-flop 57 is in its normal setting, counteres 47, 49, 65 are not advanced during fade-in or during fade-out.

If a fadeover (a fade-out, followed by a limited film rewind, followed by a fade-in) is to be performed, the user of the camera closes not only the release switch 76 but also the fadeover switch 58. This switches the film-transport motor 1 for forward film transport. Additionally, the J-input of first JK flip-flop 57 and the upper input of NOR-gate 60 receive "1" signals. At the output of gate 60, there appears a "0" signal which enables the flip-flop 57 and the counters 47, 48, 65 (i.e., by causing their R-inputs to now receive "0" signals). The J-input of storage flip-flop 57 is currently in receipt of a "1" signal; accordingly, upon generation of the next-following clock pulse from pulse generator 42, storage flip-flop 57 becomes set, as a result of which the signal at its output Q changes from "0" to "1". Information representing a fadeover command is now stored in the JK flip-flop 57.

The "1" signal at output Q of storage flip-flop 57 is applied to the upper input of AND-gate 53, whose lower input receives frame pulses generated by frame-pulse switch z. Additionally, the "1" signal at output Q of storage flip-flop 57, via gate 109, renders transistor 30 conductive. Accordingly, for the duration of the fadeover, the base repetition frequency of stepper-motor energizing pulses is increased to the higher value. The frame pulses are transmitted to the output of gate 53 and are applied to the inputs of gates 86 and 50. Because counter 48 is not yet switched on, its outputs A1–A4 carry "0" signals. As a result, the signal at the output of gate 85 is a "1". This "1" signal is applied to gate 86. Gate 86 is accordingly enabled. Program counter 65 likewise is still in its normal setting, i.e., a "1" signal is present on its output A0. This "1" signal is applied via inverter 52 as "0" signals to gates 98, 50, 96. These gates are accordingly disabled. The frame pulses transmitted via gate 53 are further transmitted via gate 86.

For the purpose of explanation, it is assumed that the ON-OFF ratio of the pulses from second pulse generator 34 (i.e., the ratio of the durations of its pulses to the durations of the interpulse intervals thereof) is adjusted by means of resistor 41 to a value such that the pulse duration (ON-time) of these pulses is 15 times as long as the duration of one period of the pulse train furnished by first pulse generator 42 (i.e., 15 times as long as the sum of the ON- and OFF-times of the pulse train furnished by pulse generator 42).

After the storage flip-flop 57 registers a fadeover command (represented by a "1" signal at its output Q), the next frame pulse generated by frame-pulse switch z produces a "1" signal at the output of gate 53 and a "0" signal at the output of gate 86. The "0" signal from the output of gate 86, through the intermediary of inverter 87, disables gate 89. Additionally, gate 88 becomes enabled. The J-input of second storage flip-flop 90 does not receive a "1" signal until the value of the output from pulse generator 34 changes from "1" to "0". When that occurs, the next-following flank of the pulse from generator 42 causes storage flip-flop 90 to undergo a change of state, as a result of which a "1" signal appears at the Q output thereof and is applied to the input of gate 91. This "1" signal cannot yet be transmitted to the output of gate 91, because the output of pulse generator 34 is still at the "0" level. This start-up expedient prevents counter 48 from receiving (via gate 91) a pulse whose duration does not exactly correspond to the setting of potentiometer 41 of pulse generator 34.

Only after the potential at the output of second pulse generator 34 returns to the "1" level, does a "1" signal appear at the output of gate 91 and become applied to the control input E of the second counter 48.

Now, via its input C, second counter 48 begins to count up the pulses furnished by the first pulse generator 42; this continues for as long as there is a "1" signal at the output of second pulse generator 34 and of gate 91. The duration of this pulse from pulse generator 34 is established in advance by setting potentiometer 41, as already explained. According to the assumption specified above, second counter 48 counts up fifteen pulses and stores that count. As soon as the first such pulse has been counted by second counter 48, a "1" signal appears at the output of gate 85, causing gate 86 to become disabled. "1" signals are again applied to the inputs of gates 88 and 87; as a result, when the output signal of second pulse generator 34 changes from the "1" to the "0" level, storage flip-flop 90 becomes reset again, by a clock pulse from pulse generator 42. This circuit expedient assures that at the start of a fadeover there will be generated a single, well-defined pulse for enabling counter 48.

The change of the output signal of gate 86 from the "0" to the "1" level causes, via gate 67, the program-step counter 75 to advance by one count, i.e., the output A0 of counter 65 now carries a "0" signal, whereas its output A1 now carries a "1" signal. The "0" signal at output A0 is applied via inverter 52 as a "1" signal to the input of AND-gate 50, enabling gate 50 for transmission of frame pulses. Additionally, gates 98 and 96 become enabled.

Now, the frame pulses generated by frame-pulse switch z are applied to the input C of first counter 47, counted up, and the count stored.

The aforementioned appearance of a "0" signal at output A0 causes a "0" signal to appear at the output of gate 96. As a result, the third counter 49 is readied for operation. Accordingly, the third counter 49 counts the pulses generated by generator 42.

The gates 111–114 compare the signals on outputs A1–A4 of third counter 49 with the signals on outputs A1–A4 of second counter 48. After 15 pulses from pulse generator 42, all outputs A1–A4 of second counter 48 carry "1" signals. If 15 pulses have been counted by third counter 49, then a "1" signal appears at the output of gate 115. As a result, via its input C, the third counter 49 becomes arrested. Furthermore, this "1" signal is transmitted via gate 98 to NOR-gate 99. As a result, transistor 32 becomes conductive, and stays conductive until counter 49 begins to perform its next counting cycle.

This occurs only after the "0" to "1" transition of the next pulse from generator 34 causes a positive pulse, via differentiator 92, 93, 94, to become applied to the inverter 95, and therethrough applied as a "0" pulse to the gate 96. The R-input of third counter 49 receives a "1" signal, as a result of which third counter 49 becomes erased or reset. Shortly after the transmission of the positive pulse to the inverter 95, the input of inverter 95 is again in receipt of a "0" signal. Accordingly, the corresponding input of gate 96 receives a "1" signal and the R-input of counter 49 a "0" signal. As a result, counter 49 is enabled for another counting cycle. During the resetting of third counter 49, the output of gate 115 carries a "0" signal. As a result, a "0" signal is present at the output of gate 98. This is turn results in the application of a "1" signal to the base of transistor 32, and transistor 32 becomes non-conductive again. Transistor 32 stays non-conductive as counter 49 now performs another counting cycle, and then becomes conductive again at the end of this second counting cycle of counter 49, etc. In other words, when counter 49 is performing a counting cycle transistor 32 is non-conductive and when transistor 49 is between counting cycles transistor 32 is conductive. Thus, during program step A1 (and for each program step in general) transistor 321 is rendered conductive and non-conductive with a duty factor determined by the pulse duration to which pulse generator 34 was set at the moment when the user selected a fadeover operation. i.e., if the user should happen to change the setting of potentiometer 41, for example between the two scenes of a fadeover, this will have no effect, because the number of pulses in the pulse packet registered by reference counter 48 cannot be changed prior to completion of the entire fadeover operation.

Thus, if the user has set potentiometer 41 to a setting resulting in a short pulse duration for generator 34, a correspondingly small number of pulses will constitute the pulse packet registered by reference counter 48, and the duty factor of transistor 32 will be correspondingly high. If the user has set potentiometer 41 to a setting resulting in a longer pulse duration for generator 34, a correspondingly large number of pulses will constitute the pulse packet registered by reference counter 48, and the duty factor of transistor 32 will be correspondingly smaller. Inasmuch as the pulse duration of generator 34 selected by the user also determines the durations of the program steps and the duration of the fadeover as a whole, it will be seen that the adjustment speed of stepper motor 23 varies inversely to the duration of the fadeover, and in particular to component program steps thereof. Specifically, irrespective of the number of frame pulses which first counter 47 must receive to complete its counting cycle, the extent to which stepper motor 23 will have adjusted the diagram 26 during one such counting cycle of counter 47 will always be the same. Irrespective of the number of film frames transported during the fade-out phase of the fadeover operation, the total extent to which stepper motor 23 will have changed the diaphragm setting during the fade-out phase will always be the same. The total extent to which the diaphragm setting has been changed can be expressed in the number of stepper motor energizing pulses, or in corresponding steps of diaphragm-setting change.

During the first program step A1 of program-step counter 65, the actual fade-out has not yet been performed. The ON-OFF control of transistor 32 described above has not yet had any practical effect, but begins to as the actual fade-out commences.

The program step A1 of counter 75 continues, as first counter 47 counts up frame pulses. When first counter 47 has counted 15 frame pulses, the "1" signals on its outputs correspond to the "1" signals on the outputs of the reference counter 48. Thus, a "1" signal appears at the output of gate 84. This is applied to the C input of program counter 65, and the "1" signal at the A1 of output of counter 65 converts to a "0" signal, and the "0" signal at the A2 output of counter 65 converts to a "1" signal; i.e., program step A2 of counter 65 has commenced. Additionally, via gates 32 and 62, a "1" signal is applied to the input R of the first (frame pulse) counter 47. As a result, counter 47 becomes erased and reset. As soon as the current frame pulse (i.e., the 15th) has ended, input R of counter 47 again receives a "0" signal, via gates 53, 63, 62, so as to be readied for another frame-pulse counting cycle.

When program-step counter 65 converts from its A1 to its A2 state, a "1" signal appears at the output of gate 69. As a result, a "0" signal appears at the output of gate 70 and renders transistor 33 non-conductive. This produces an imbalance of the bridge circuit 16–20 corresponding to the resistance of resistor 18. This imbalance enables stepper-motor control circuit 22 to transmit energizing pulses to stepper motor 23. Stepper motor 23 begins to change the setting of diaphragm 26, and changes the diaphragm setting by a number of setting steps corresponding to the resistance of resistor 18.

Meanwhile (i.e., at the start of program step A2 of program-step counter 65), first counter 47 has begun to count frame pulses and third counter 49 has begun to perform its series of counting cycles. Accordingly, as first counter 47 performs a complete frame-pulse counting cycle, third counter 49 repeatedly performs its counting cycles. When counter 49 is performing a counting cycle, transistor 32 is non-conductive; when counter 49 is between counting cycles, transistor 32 is conductive. Accordingly, during program step A2 of program-step counter 65, the adjustment speed of stepper motor 23 will have a value inversely related to the number of frame pulses which counter 47 must count to perform a complete frame-pulse counting cycle.

When counter 47 has completed its counting cycle, another counting pulse is applied to input C of program counter 65, via gates 84 and 67. The program counter 65 converts from its A2 state to its A3 state.

The conversion of program counter 65 to its A3 state has no effect upon transistor 33, which continues to be held non-conductive via gates 69 and 70. Also, transistors 3 and 4 are maintained conductive via gate 68, and so motor 1 continues to be connected for forward film transport.

After frame-pulse counter 47 has performed its counting cycle, the program counter 65 is advanced from its A3 to its A4 state. As a result, transistors 3 and 4 are rendered non-conductive, via gate 68. Additionally, via gate 74, the two transistors 2 and 6 become biased for conduction, so that now the film-transport motor 1 is connected for rewind.

During this A4 program step of counter 65, and during the subsequent A5 and A6 program steps thereof, transistors 2 and 5 are kept conductive for film rewind. Also, transistor 33 is maintained non-conductive, via gate 70.

When program counter 65 converts to its A7 state, transistors 3 and 4 become biased for conduction by means of gate 68, so that the film-transport motor 1 is again connected for forward film transport. Additionally, via gates 71 and 78, transistor 77 is rendered non-conductive. Also, gate 72 receives a "1" signal, readying it for response to closing of the release switch 76.

When transistor 77 goes non-conductive, relay 7 becomes deenergized, and contact 6 opens, interrupting the current path for film-transport motor 1. Because transistor 33 is still non-conductive, the aperture of diaphragm 26 remains stepped down by the number of aperture-setting steps by which it had already been brought down. i.e., if the scene light level changes, the negative-feedback diaphragm control system can respond appropriately, but because fadeover resistor 18 is still connected in the light-sensitive bridge 16–20, the system continues to be in a state awaiting the commencement of a fade-in.

This program step A7 of program-step counter 65 is the "waiting" program step. i.e., a fade-out and rewind have been completed, and the camera is in readiness for the user to commence filming of the next scene, the scene to be faded-in. If the user should inadvertently change the fadeover duration selected by means of potentiometer 41, this will have no effect upon the not yet completed fadeover operation.

It should be noted that during "waiting" program step A7 of counter 65, frame-pulse counter 47 does not perform a counting cycle, because film is not being transported and accordingly frame pulses are not being generated.

When the user is ready to commence filming of the next scene, the scene to be faded-in, he closes release switch 76. This energizes relay 7 and accordingly closes contact 6. Motor 1, connected for forward film transport, now receives current and effects forward film transport. Via gate 72, a "1" signal is applied to the input of gate 67. As a result, a "1" signal is applied to the C-input of program-step counter 65, and the latter converts from its "waiting" state A7 to its state A8. The "1" to "0" transition at output A7 of program counter 65 causes gate 70 to render transistor 33 conductive and short-circuit fadeover resistor 18. Accordingly, the fade-in commences. Frame-pulse counter 47 counts up 15 frame pulses, and the program counter 65 in response thereto advances to its A9 state.

Frame-pulse counter 47 performs another counting cycle, and the program counter 65 advances to its A10 state. The actual fade-in operation is now completed.

After frame-pulse counter 47 performs another counting cycle, program counter 65 is returned to its A0 state.

Via gates 52 and 78, transistor 77 is rendered non-conductive. However, filming will continue to occur, as long as release switch 76 continues to be held closed by the user. Also, by means of gate 52, gates 96, 60, 98 and 50 are disabled. The gate 60 erases the counters 47 and 48. Furthermore, the "fadeover" command registered in JK flip-flop 57 is erased. Counter 49, too, is reset, via gate 96. Because flip-flop 57 is now in its normal state (i.e., not registering a "fadeover" command), it disables gate 53. Transistor 30, which was conductive throughout the entire fadeover operation, becomes non-conductive, so that the base adjustment speed for stepper motor 23 reverts to its normal value.

A few words should be said about the stepper-motor control circuit 22, and about the relationships among the various frequencies and pulse duty factors in the illustrated circuit.

Stepper-motor control circuit 22 has two inputs, one for receipt of a control signal indicating that the diaphragm aperture should be increased, the other for receipt of a control signal indicating that the diaphragm aperture should be decreased. These aperture-increase and aperture-decrease control signals are furnished by comparator amplifier 21. Comparator amplifier 21 produces an aperture-increase signal if the light-sensitive bridge circuit is imbalanced in a first sense, in excess of a certain minimum amount; likewise, 21 produces an aperture-decrease signal if the light-sensitive bridge circuit is imbalanced in the opposite sense, in excess of a certain minimum amount. If the bridge circuit is only slightly imbalanced, then no aperture-increase or aperture-decrease control signal is furnished; i.e., a dead zone is deliberately established, to prevent hunting.

The stepper-motor control circuit conventionally includes a forward-backward ring counter, each output of which is connected to one of the four stator windings of stepper motor 23. Each time the ring counter receives an input pulse, a different one of the four stator windings becomes energized, producing rotation of the stepper motor rotor. Conventionally, the forward-backward ring counter has a forward-counting control input and a backward-counting control input. When a control signal is applied to the forward-counting control input, then the input pulse applied to the ring counter causes the counter to count in a first direction, resulting in forward motor operation. When a control signal is applied to the backward-counting control input, then the input pulses applied to the ring counter cause the counter to count in the opposite direction, resulting in reverse motor operation. The forward-counting and backward-counting control inputs of the ring counter are connected to respective ones of the two outputs of the comparator amplifier 21.

The pulses actually applied to the input of the ring counter, i.e., the pulses to be counted, are produced by the aforementioned oscillator internal to stepper-motor control circuit 22. This oscillator is, for example, an astable multivibrator, provided with resistors and capacitors which establish the time-constant for the ON-stage of the multivibrator and the time-constant for the OFF-state of the multivibrator, and thereby the durations of the ON- and OFF-states thereof. The externally depicted time-constant elements 27–29 determine the time-constant for one state of the oscillator.

In the exemplary embodiment just described, the count on frame-pulse counter 47 is advanced by one count per frame pulse. The capacity of counter 47 was fifteen frame pulses, correspondingly limiting the duration of a frame-pulse counting cycle. Inasmuch as the duration of the frame-pulse counting cycles determines the duration of each program step of program counter 65, the total duration of the fadeover operation is correspondingly limited. Thus, only 15 different durations for the fadeover operation can be selected. If it is desired that a greater number of fadeover durations be selectable, resort can be had to the modification depicted in FIG. 2, in which the frame-pulse counter receives pulse packets.

Figure 2:
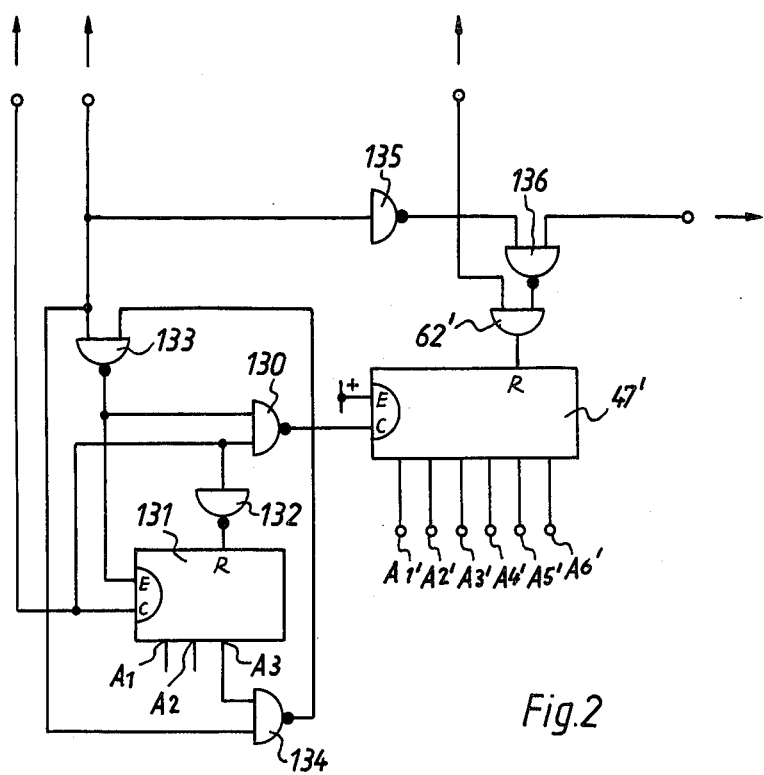

In the modification shown in FIG. 2, first counter 47' counts for frame pulses per transported film frame. The counter 47' is a 6-bit counter, in contrast to the 4-bit counter 47 of FIG. 1a. When the counter 47' is used, the second and third counters 48, 49 will likewise be provided with six output lines. The C-input of first counter 47' is connected to the output of a NAND-gate 130, whose one input is connected to the C-input of a counter 131. This C-input is additionally connected to the gate 50 of FIG. 1a. The C-input is furthermore connected, via an inverter 132, to the R-input of counter 131. The control input E of counter 131 is connected to the other input of gate 130 and also to the output of a gate 133, whose one input is connected to pulse generator 42 and whose other input is connected to the output of a gate 134. One input of gate 134 is connected to pulse generator 42, and its other input is connected to the output A3 of counter 131. The output of pulse generator 42 is connected, via an inverter 135, to a gate 136, whose other input is connected to program counter 65.

The output of gate 136 is connected to the input of a gate 62', which corresponds to the gate 62 of FIG. 1a. The other input of gate 62' is connected to the gate 60 of FIG. 1a. The pulse-repetition frequency of pulse generator 42 is, for the modification of FIG. 2, four times what it is in the embodiment of FIGS. 1a and 1b. When gate 50 supplies a frame pulse to the C-input of counter 131, the counter is enabled for counting, via gate 132. Additionally, counter 47' is enabled for counting, via gate 130. Now, via gate 133, four pulses from pulse generator 42 are applied to and counted by counter 131. Then, by means of gate 134, gate 133 becomes disabled. Only upon the "0" to "1" transition occurring at the C-input of counter 131 as a frame pulse ends, does counter 131 become reset via gate 132. Thereupon, the gate 134 again enables the gate 133. With the next frame pulse, four further pulses are applied to and counted by counter 131. So long as counter 131 counts, four pulses at a time are applied by gate 133 to gate 130, and the frame pulses in question are thus transmitted to counter 47'. Accordingly, counter 47' counts four pulses per transported frame.

For the modification in FIG. 2, all other circuit operations are performed just as in FIGS. 1a and 1b. When the output signals on lines A1' to A6' of counter 47' are the same as those on the six outputs of the (non-illustrated) reference counter, a "1" signal is produced at the output of a gate corresponding to gate 84 of FIG. 1a, and transmitted through gate 67 to the C-input of program-step counter 65 and also to the input of gate 136. The next "1" to "0" flank of pulses from pulse generator 42 causes counter 47' to become reset.

If the fade-out and fade-in phases of the fadeover operation each have a duration corresponding to three counting cycles of the frame pulse counter 47 or 47', then for the modification of FIG. 2 the successive durations selectable for a fadeover, expressed in the number of transported frames involved in the fadeover, differ by three-fourths of a frame. In the embodiment of FIGS. 1a and 1b, the successive durations selectable for a fadeover differ by three frames. Accordingly, for the modification of FIG. 2, the range of selectable fadeover durations is more densely filled with selectable values, i.e., approximating towards a continuous range of selectable values.

It will be understood that each of the elements described above, or two or more together, may also find a useful application in other types of circuits and constructions, differing from the types described above.

While the invention has been illustrated and described as embodied in a motion-picture camera capable of producing fade-in, fade-out and fadeover effects, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a motion-picure camera, in combination, an adjustable diaphragm; light-sensitive negative-feedback diaphragm control means operative for automatically adjusting the diaphragm setting in dependence upon scene light, including an adjusting motor coupled to the diaphragm, a film-transport motor operative for transporting film and means for generating frame pulses indicative of the number of transported frames; pulse-generating means operative for generating a pulse train; gating means having an input connected to receive pulses from the pulse-generating means and including selecting means for selecting the gating duration of the gating means to provide at the output of the gating means a reference pulse packet consisting of a selected number of pulses; first counting means connected to receive the frame pulses and operative for counting in dependence thereon; second counting means; comparator means connected to the first and second counting means for generating a program-step-change signal when the counts on the first and second counting means are the same; program-step counting means having an input connected to the comparator means and operative for counting program steps in dependence upon program-step-change signals furnished by the comparator means; means operative for initiating a sequence of program steps, including means for causing the second counting means to register the pulses of the reference pulse packet; means operative at the end of each program step in response to a program-step-change signal from said comparator means for resetting the first counting means for performance of another counting cycle for the next program step; logic circuit means connected to the program-step counting means, connected to the negative-feedback diaphragm control means and connected to the film-transport motor and operative for implementing fade-out and fade-in operations by altering the balance of the negative-feedback control means and controlling the energization of the film-transport motor in dependence upon the counts registered by the program-step counting means; and adjusting-speed control means connected to the second counting means and to the negative-feedback diaphragm control means, operative for causing the extent to which the adjusting motor alters the diaphragm setting during the course of each counting cycle of the first counting means to be constant irrespective of the number of pulses in the reference pulse packet registered by the second counting means, by automatically setting the adjusting speed of the adjusting motor to a value inversely related to the number of pulses in the reference pulse packet.

2. In a motion-picture camera as defined in claim 1, the negative-feedback diaphragm control means including energizing means for energizing the adjusting motor, the adjusting-speed control means including a semiconductor switch connected in circuit with the energizing means and means operative for controlling the conduction of the semiconductor switch in dependence upon the number of pulses in the reference pulse packet registered by the second counting means.

3. In a motion-picture camera as defined in claim 2, the adjusting motor being a stepper motor, the energizing means comprising means for furnishing energizing pulses to the stepper motor at a predetermined base rate, thereby establishing a predetermined base adjustment speed for the stepper motor, the means furnishing energizing pulses including timing means operative for establishing the base rate, the semiconductor switch being connected in circuit with the timing means, the means for controlling the conduction of the semiconductor switch comprising means operative for establishing a semiconductor-switch duty factor dependent upon the number of pulses in the reference pulse packet such that the number of energizing pulses furnished to the stepper motor per counting cycle of the first counting means is inversely related to the number of pulses in the reference pulse packet registered by the second counting means.

4. In a motion-picture camera as defined in claim 2, the means for controlling the conduction of the semiconductor switch comprising third counting means having an input connected to the pulse-generating means for counting in dependence upon the pulses from the latter, comparator means having inputs connected to the second and third counting means and operative for furnishing a switch-control signal when the counts on the second and third counting means are the same, means operative in dependence upon the switch-control signal for changing the conduction state of the semiconductor switch and also arresting the third counting means, and means operative for thereafter causing the third counting means to perform another counting cycle.

5. In a motion-picture camera as defined in claim 4, the comparator means connected to the first and second counting means and the comparator means connected to the second and third counting means each comprising a set of EXCLUSIVE-OR gates, the two inputs of each EXCLUSIVE-OR gate being connected to corresponding outputs of the associated two counting means, and a NOR-gate having inputs connected to the outputs of the EXCLUSIVE-OR gates.

6. In a motion-picture camera as defined in claim 4, the program-step counting means being a 1-out-of-$n$ binary counter having $n$ outputs on single successive ones of which an output signal is produced to constitute the successive counts of the counter, the $n$ outputs of the counter being subdivided into five output groups, each output group consisting of at least one output, the second, fifth and sixth output groups each consisting of the same number of outputs, the logic circuit means including means connected to the first output group operative in dependence thereon for enabling the first counting means to respond to frame pulses and for enabling the semiconductor switch to respond to the switch-control signal, an OR-gate having inputs connected to the outputs of the second, fourth and fifth output groups and connected to the output of this OR-gate means operative in response to a signal from this OR-gate for switching the film-transport motor for forward film transport, an OR-gate having inputs connected to the outputs of the third output group and connected to the output of this OR-gate means operative in response to a signal from this OR-gate for switching the film-transport motor for reverse film transport, a further OR-gate having inputs connected to the outputs of the second, third and fourth ouput groups and connected to the output of this OR-gate means operative for imbalancing the negative-feedback diaphragm control means in a first sense to effect an aperture size decrease for fade-out and in a second sense to effect an aperture size increase for fade-in.

7. In a motion-picture camera as defined in claim 1, the pulse-generating means constituting first pulse generating means for generating a first pulse train; the gating means including second pulse-generating means operative for generating a second pulse train whose pulse-repetition frequency is lower than that of the first pulse train by a factor equal to at least the maximum number of pulses countable by the second counting means, the pulses of the second pulse train each lasting for a pulse time interval and the interpulse pauses of the second pulse train each lasting for an interpulse time interval, the selecting means being means for selecting the duration of at least one of said time intervals, the means for initiating a sequence of program steps including a fadeover switch operable by the user for commanding a fadeover operation, a first bistable storage device connected to the fadeover switch and operative in response thereto for storing a fadeover command for the entire duration of a fadeover operation, means connected to the first bistable storage device and operative in response to storage of a fadeover command for causing the first counting means to become responsive to frame pulses, a second bistable storage device having a first-state input and a second-state input and a clock-signal input, means connected to the second counting means and to the first-state input of the second bistable storage device for applying a signal thereto in response to commencement of counting by the second counting means, means connecting the second pulse-generating means to the second-state input of the second bistable storage device for applying signals thereto in dependence upon the pulses generated by the second pulse-generating means, means connecting the first pulse-generating means to the clock-signal input of the second bistable storage device for applying signals thereto in dependence upon the pulses generated by the first pulse-generating means, the means for causing the second counting means to register the pulses of the reference pulse packet comprising a gating circuit operative for transmitting a pulse from the second pulse-generating means to the second counting means when the second bistable storage device is in a predetermined one of its states.

8. In a motion-picture camera as defined in claim 7, the negative-feedback diaphragm control means including energizing means for energizing the adjusting motor, the adjusting-speed control means including a semiconductor switch connected in circuit with the energizing means and means operative for rendering the semiconductor switch conductive and non-conductive with a frequency equal to the pulse-repetition frequency of the second pulse train and with a duty factor dependent upon the number of pulses in the reference pulse packet registered by the second counting means.

9. In a motion-picture camera as defined in claim 7, the bistable storage devices being JK master-slave flip-flops.

10. In a motion-picture camera as defined in claim 9, the first JK master-slave flip-flop having a clock-signal input connected to receive pulses from the first pulse-generating means, further including means connecting the reset input of the first JK master-slave flip-flop to the fadeover switch for keeping the first JK master-slave flip-flop in reset condition when the fadeover switch is not operated by the user, the J-input of the first JK master-slave flip-flop being connected to the fadeover switch for receipt of a signal when the fade-over switch is operated by the user, and means operative for permanently applying "0" signals to the S-input and the K-input of the first JK master-slave flip-flop.

11. In a motion-picture camera as defined in claim 7, said means for applying a signal to the first-state input of the second bistable storage device in response to commencement of counting by the second counting means including a NOR-gate having inputs connected to the outputs of the second counting means, and a further gate having one input connected to the output of the NOR-gate and having another input connected to receive frame pulses and having an output connected to the first-state input of the second bistable storage device.

12. In a motion-picture cameras as defined in claim 11, the output of said further gate being furthermore connected to the input of the program-step counting means for furnishing thereto a pulse when the second counting means begins to count, the logic circuit means including means operative for detecting when the program-step counting means is in the process of counting and generating a program-in-process signal indicating that the program-step counting means is counting, the means for initiating a sequence of program steps furthermore including a NOR-gate connected to receive the fadeover command signal and the program-in-process signal and when in receipt of either of the latter operative for enabling the first counting means for operation.

13. In a motion-picture camera as defined in claim 12, said further gate being connected to the input of the program-step counting means through the intermediary of a differentiator and an OR-gate, the OR-gate having an input connected to the output of the comparator means.

14. In a motion-picture camera as defined in claim 13, further including an AND-gate having an output connected to an input of the OR-gate, further including a release switch activatable by the user to initiate filming and operative when activated for applying a signal to one input of the AND-gate, the logic circuit means including means operative as the program-step counting means counts for causing the diaphragm control means and the film-transport motor to effect a fade-out followed by a film rewind, and means operative for furnishing a waiting signal when the program-step counting means has reached the program-step count which follows the film rewind, the other input of the AND-gate being connected to receive the waiting signal.

15. In a motion-picture camera as defined in claim 1, the logic circuit means including means operative as the program-step counting means counts for causing the diaphragm control means and the film-transport motor to effect a fade-out followed by a film rewind, means operative for furnishing a waiting signal when the program-step counting means has reached the program-step count which follows the film rewind, a fadeover switch activatable by the user to generate a fadeover command signal, a bistable storage device connected to receive and store the fadeover command signal for the entire duration of the sequence of program steps counted by the program-step counting means, enabling means operative when the bistable storage device is storing a fadeover command signal for enabling the first counting means to count in dependence upon frame pulses, a release switch activatable by the user to initiate filming and operative when activated for generating a start-filming signal, and means connected to receive both the waiting signal and the start-filming signal and operative in response to concurrent receipt of the waiting and start-filming signals for applying to the program-step counting means a program-step-change signal independently of the operation of the first counting means, the camera being provided with an energy source, at least the second counting means, the program-step counting means, the bistable storage device, the enabling means and the means operative for furnishing the waiting signal being constituted by C-MOS integrated circuitry, further including means connecting at least the second counting means, the program-step counting means, the bistable storage device, the enabling means and the means operative for furnishing the waiting signal to the energy source for energization by the energy source during the entirety of the sequence of program steps counted by the program-step counting means, whereby to assure that subsequent to film rewind when the camera is in readiness for the filming of the scene to be faded-in the information representing how far the sequence of program steps has progressed will not be lost.

16. In a motion-picture camera as defined in claim 4, the semiconductor switch having a control electrode, further including an AND-gate having an output connected to the control electrode and having two inputs, means connected to the program-step counting means operative for generating a program-in-process signal when the program-step counting means is counting and applying the program-in-process signal to one input of the AND-gate, the other input of the AND-gate being connected to the output of the comparator means connected to the second and third counting means, the logic circuit means including a further gate whose output is connected to the reset input of the third counting means, one input of the further gate being connected to receive the program-in-process signal, an inverter and a differentiator connecting the second pulse-generating means to the other input of the further gate, the third counting means having a counting-arrest input connected to the output of the comparator means connected to the second and third counting means.

17. In a motion-picture camera as defined in claim 16, the differentiator including a rectifier connected to transmit only the positive-going flanks of the pulses from the second pulse-generating means to the further gate.

18. In a motion-picture camera as defined in claim 1, including means operative for applying to the first counting means a predetermined plurality of pulses to be counted for each generated frame pulse.

* * * * *